United States Patent [19]

Wittlinger et al.

[11] 4,166,966

[45] Sep. 4, 1979

[54] ROTARY PULSE GENERATOR FOR AUTOMATIC ENGINE IGNITION ADVANCE AND RETARD

[75] Inventors: Karl F. Wittlinger, Schwieberdingen; Jörg Issler, Stuttgart, both of Fed. Rep. of Germany

[73] Assignee: Robert Bosch GmbH, Stuttgart, Fed. Rep. of Germany

[21] Appl. No.: 849,943

[22] Filed: Nov. 9, 1977

[30] Foreign Application Priority Data

Nov. 12, 1976 [DE] Fed. Rep. of Germany ....... 2651658

[51] Int. Cl.$^2$ .............................................. H02K 39/00

[52] U.S. Cl. .................................. 310/111; 310/70 R; 310/70 A; 310/153; 310/168; 123/148 CC

[58] Field of Search ...................... 310/111, 153, 70 R, 310/70 A, 168, 150; 123/148 CC, 148 CA, 148 RB, 149 DK, 149 A, 149 F

[56] References Cited

U.S. PATENT DOCUMENTS

| | | | |
|---|---|---|---|
| 1,998,409 | 4/1935 | Klaiber | 310/155 |
| 2,270,877 | 1/1942 | Herzog | 310/155 |
| 2,454,367 | 11/1948 | Artzt | 310/111 |
| 3,974,815 | 8/1976 | Katsumata | 123/148 CC |

*Primary Examiner*—Donovan F. Duggan
*Attorney, Agent, or Firm*—Frishauf, Holtz, Goodman & Woodward

[57] ABSTRACT

An engine driven rotor has pairs of arms of different lengths passing by the stator core teeth with respectively different clearances. The stator teeth carry pick-up coils that are connected in series-aiding relation. Although the stator teeth are uniformly spaced, the rotor arms, that are equal in number to the stator teeth, have the longer pair angularly offset from equiangular relation to the shorter pair in such a way that when the rotor moves in its normal direction, a weak pulse is followed by a stronger one and this pattern is repeated four times per revolution. The output of the coils is supplied to a threshold switch, which will be triggered on the second of the pair of pulses at low rotation speeds of the rotor and on the first of the pair of pulses at high speeds.

5 Claims, 4 Drawing Figures

ROTARY PULSE GENERATOR FOR AUTOMATIC ENGINE IGNITION ADVANCE AND RETARD

This invention relates to rotary apparatus for repetitively producing trains of waves within which the individual waves are of ascending amplitude, with the further characteristic that the wave amplitude increases with the speed of rotation of the device. Such apparatus is particularly useful for timing the ignition of a gasoline engine to provide the spark advance with increasing engine speed and spark retard with decreasing speed. This spark advance and retard function has long been known to be advantageous for the operation of internal combustion engines.

It is also known to utilize multiple spark ignition pulses at the firing time of each cylinder for improving the combustion of the explosive mixture.

In order to obtain automatic spark advance and retard according to engine speed and likewise in order to obtain multiple ignition triggering pulses, complicate and expensive circuits have heretofore been necessary.

In German published patent application (OS) No. 22 11 575, an ignition system is described in which a magnetogenerator having an armature winding that at the same time operates as the spark coil periodically generates pairs of successive pulses in which one pulse has a peak amplitude different from that of the other, the second one having the greater peak amplitude. This system operates to utilize the second pulse at low speeds and the first of the paired pulses at high speeds, but it has the disadvantage that it cannot be readily built into the ignition control pulse generators used in present-day motor vehicles without expensive modification or redesign.

THE PRESENT INVENTION

It is an object of the present invention to provide apparatus for repetitively producing trains of waves of ascending peak amplitude in which the amplitude increases overall with repetition rate, in a simple and inexpensive fashion that is compatible with modern engine ignition systems. It is further desired that the apparatus should be useful for retrofitting into existing ignition systems.

Briefly, a plurality of pick-up coils is disposed about a rotary shaft for responding to the variation in magnetic reluctance in a magnetic circuit including the shaft and the interior of the respective coil, the coils being connected in series, and radially disposed ferromagnetic means are provided for causing each pick-up coil to produce a voltage wave having a peak-to-peak magnitude which is the greater, the greater is the length of the particular one of said members, these members being arranged so that each coil produces a repeating train of waves of ascending magnitude. Preferably, the ferromagnetic means include a tooth aligned with each of the pick-up coils having the same spacing from the rotary shaft and members of different radial length that rotate with the shaft. In one embodiment, these members may be combined into a stepped portion of a rotor mounted on the shaft, in which case there needs to be only one pick-up coil for each stepped rotor portion, but preferably the members are arms of different length extending from the shaft operating by having different clearances from the teeth aligned with the respective pick-up coils. In the preferred case, the radial members are diammetrically paired, the pick-up coils are likewise diammetrically paired and evenly distributed around the shaft, but the members of one length are offset circumferentially from equiangular relations with the members of another length, so that the waves produced by the respective pairs of members will be staggered with respect to each other so as to produce waves in ascending order of magnitude in the common output of the pick-up coils during rotation of the shaft in its normal direction.

The apparatus of the invention as the advantage that it can easily be built into an electronic pulse generator as a replacement of the mechanical ignition distributor of an engine, the replacing electronic pulse generator serving both the distributing function and also the ignition timing function, including the spark retard at low engine speeds. By such a replacement, both a renewal of equipment and at the same time an improvement of the operating properties of the equipment is possible, even in the case of engines that have been in service for a considerable time, and at an economical price.

It is particularly advantageous to provide the rotor of the apparatus in such a way that it can simply replace the rotor of an ignition system already using inductive ignition pulse generators.

Drawing, illustrating an example.

Experience has shown that it is advantageous to advance the ignition timing of an engine as it starts up and, likewise, to retard it as it slows down to idling. The "retarding" shift of the ignition timing signifies that each spark takes place a little later in the piston cycle than it otherwise would.

Figure 1:
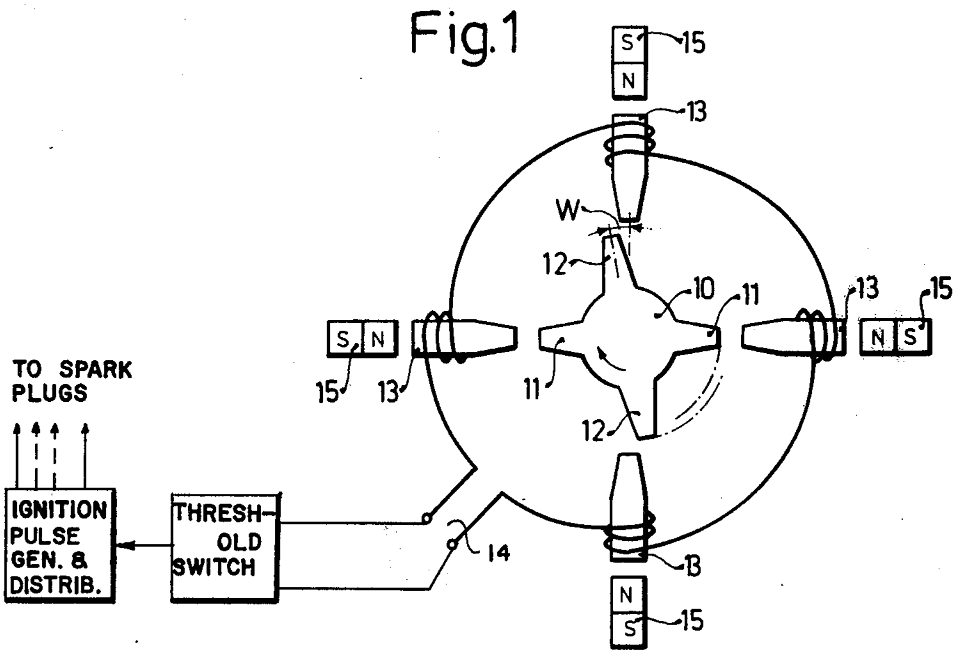
FIG. 1 is a diagrammatic representation of an illustrative embodiment of apparatus according to the invention.

FIG. 1 shows diagrammatically the essential features of construction of a pulse generator coupled mechanically to a gasoline engine for controlling the spark ignition of an engine that requires four pulses per revolution. A revolving rotor 10 driven by the engine is provided with four arms 11 and 12 that are arranged in opposite pairs. The arm pairs do not subdivide the rotor symmetrically. One pair of arms is shifted by the angle W compared to a symmetrical or equiangular disposition. Furthermore, one pair of arms has a different arm length from the other pair. The arms 11 are made shorter than the arms 12.

A stator is provided that consists of four symmetrically disposed radial members that can simply be called "teeth", each wound with a pick-up coil. The teeth 13 are made of a magnetically soft material, as are the arms 11 and 12, but the teeth 13 are backed up by magnets 15 which all face the central direction with the same polarity. The pick-up coils are so connected to each other that the induced voltages are additive (reinforce each other). The sum of these voltages can be obtained as a signal at an output 14. The ends of the magnets 15 that are farther away from the center are connected to a magnetic path for conducting the magnetic flux easily back to the center of the rotor, this not being shown in the drawing for purposes of simplicity of illustration.

MODE OF OPERATION

Figure 2:
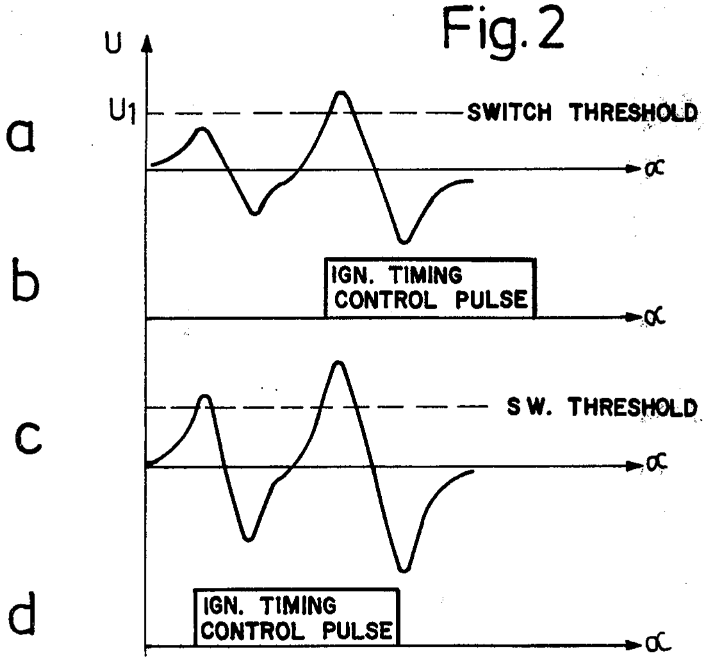
FIG. 2 is a graphical representation in the form of a timing chart for explaining the course of the voltages produced in the apparatus of FIG. 1.

Reference to the voltage-time diagram of FIG. 2 will simplify the explanation of the operation of the circuit of FIG. 1. If now, one pair of arms is swinging past a pair of teeth 13, a voltage pulse is induced in the corresponding pick-up coils by the sharp change of the magnetic reluctance that essentially depends upon the size of the air gap between magnet and rotor. The induced voltage is the higher, the greater the change of the magnetic reluctance is. Since the arms 11 are shorter than the arms 12, the gap between the teeth 13 and the arms is greater in the case of the arms 11 than the air gap between the arms 12 and the teeth when they stand in opposition. The course of the output voltage "a" with time, therefore, shows first a low pulse such as arises when the arms 11 and the teeth 13 stand opposite each other. This is illustrated in FIG. 1. If now the rotor revolves further by the angle W, the teeth 13 stand opposite the arms 12. Since in this case the spacing between the arms 12 and the teeth 13 is smaller, the magnetic reluctance is also smaller, which is to say that the induced voltage is greater. The course of the voltage a shows therefore the voltage appearing at the output 14. If the rotor turns through 360 degrees, four pulse sequences similar to a will be produced in the apparatus illustrated.

The output 14 is preferably connected to the input of a threshold switch not shown in the drawing that switches at a voltage value $U_1$ drawn in in broken lines in FIG. 2. A signal b will then be provided by the threshold switch. If now the previously low speed of the rotor is raised, the voltage induced in the coils likewise rises. This case is shown by the voltage curve c. If the arms 11 are opposite the teeth 13, the first smaller voltage pulse will be produced. When after a further rotation by the angle W the arms 12 stand opposite the teeth 13, a larger voltage pulse will be produced. Because of the now increased magnitude of the first voltage pulse, the threshold switch now switches already in response to the first voltage pulse (voltage d). The second voltage pulse is then insignificant, because the threshold switch is already in the switched-over condition. By increase of the speed, the ignition timing is switched over from a later timing to an earlier timing at a particular boundary speed value. The speed at which this switching over takes place can be set by simple features of construction. One possibility is to change the threshold voltage level value of the threshold switch. Another possibility is to change the air gap width by changing the arm length and thereby to change the peak voltage of the first wave in relation to that of the second.

In a modified embodiment of the invention, it can be useful to provide the differing pulse peak values by means of a stepped portion of the rotor, in which case as such a portion of the rotor goes around, the air gap between rotor and stator tooth is successively narrowed. By the provision of several steps, the shifting of the ignition timing for advance or retard can be provided at several speeds corresponding to the number of steps. The stator in such a case consists of at least one inductive pick-up coil.

Figure 3:
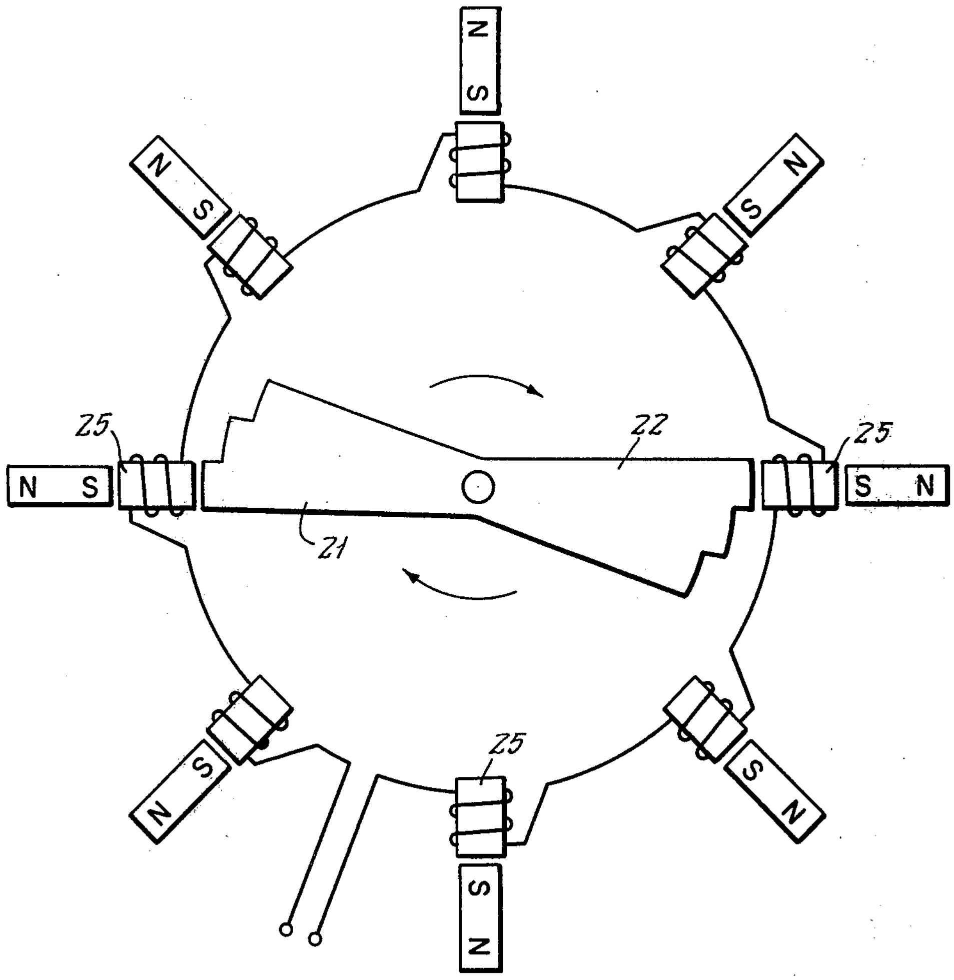
FIG. 3 is a diagram of another embodiment of the invention.
Figure 4:
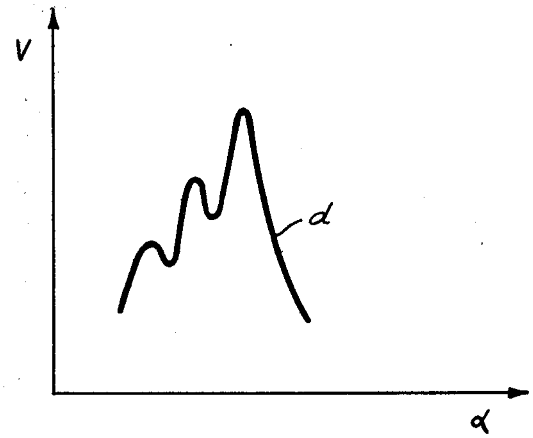
FIG. 4 is a graphical representation of a voltage pulse train produced by the device of FIG. 3.

Such a construction is illustrated in FIG. 3, again, for a motor requiring four trains of pulses for each revolution of the rotor shaft. In this case, the rotor has two diammetrically opposite stepped portions 21 and 22 and there are four pairs of teeth 25. The pulse train wave form for passage of the rotor past one pair of teeth is given by curve e in FIG. 4.

It can be advantageous under some circumstances to provide the arms of different length as parts of the stator and to put the pick-up coils on the rotor. Thus, although the invention has been described in detail with reference to a particular illustrative embodiment, it will be seen that variations and modifications are possible within the inventive concept.

We claim:

1. Apparatus for automatically controlling spark-timing shift by engine speed, for an internal-combustion engine, operating by periodically producing a train of at least two successive pulses of which each except the last is smaller than the next in peak amplitude and in which the amplitude of all of the pulses increases with the repetition rate, said apparatus comprising, in combination:

a rotary shaft having a normal direction of rotation driven by said engine;

a plurality of pick-up coils disposed around the shaft for responding to the variation in magnetic reluctance in a magnetic circuit including the shaft and the interior of the respective coil, said coils being connected in series;

an array of radially disposed ferromagnetic means including a ferromagnetic tooth aligned with each of said pick-up coils and radial members rotatable with said shaft of at least two different lengths so as to produce different minima of air gap between member and tooth as said shaft rotates, each of said teeth being equally spaced from said shaft and disposed so as to have the same clearance as each other tooth upon closest approach of the same radial member, whereby each coil produces a repeating train of waves of ascending magnitude as said shaft rotates in its normal direction, and a threshold switch connected to the combined output of said pick-up coils and operating at a voltage threshold such as to be triggered by the greatest in amplitude of the waves of said train of waves at low speeds of said shaft and by the lowest in amplitude of said waves of said train at high speeds of said shaft, the output of said threshold switch being connected so as to control the ignition timing of an internal combustion engine.

2. Apparatus for periodically producing a train of at least two successive pulses of which each except the last is smaller than the next in peak amplitude and in which the amplitude of all of the pulses increases with the repetition rate, said apparatus comprising, in combination:

a rotary shaft having a normal direction of rotation;

a plurality of pick-up coils disposed around the shaft for responding to the variation in magnetic reluctance in a magnetic circuit including the shaft and the interior of the respective coil, said coils being connected in series, and an array of radially disposed ferromagnetic means including a ferromagnetic tooth aligned with each of said pick-up coils and radial members rotatable with said shaft of at least two different lengths so as to produce different minima of air gap between member and tooth as said shaft rotates, each of said teeth being equally spaced from said shaft and disposed so as to have the same clearance as each other tooth upon closest approach of the same radial member, said radial members being provided in diammetrically opposed pairs of the same radial length and the number of said members being equal to the number of said coils, said coils being evenly distributed around said shaft, the longer diammetral pairs of members being offset from equiangular position with respect to the shorter ones in such a sense that waves produced by the respective pairs of members will be staggered with respect to each other so as to produce waves in ascending order of amplitude during rotation of said shaft in the normal direction of rotation thereof.

3. Apparatus as defined in claim 2, in which there are two pairs of said members and four of said pick-up coils.

4. Apparatus as defined in claim 2, in which there is an even number of pairs of said members, in which said members, further, are of two different radial lengths and in which pairs of members of one radial length alternate with pairs of members of another radial length, those of one radial length being offset circumferentially from equiangular relation with those of each other radial length.

5. Apparatus for automatically controlling spark-timing shift by engine speed, for an internal-combustion engine, operating by periodically producing a train of at least two successive pulses of which each except the last is smaller than the next in peak amplitude and in which the amplitude of all of the pulses increases with the repetition rate, said apparatus comprising, in combination:

a rotary shaft having a normal direction of rotation driven by said engine:

a plurality of pick-up coils disposed around the shaft for responding to the variation in magnetic reluctance in a magnetic circuit including the shaft and the interior of the respective coil, said coils being connected in series;

an array of radially disposed ferromagnetic means including a ferromagnetic tooth aligned with each of said pick-up coils, each of said teeth being equally spaced from said shaft, and a ferromagnetic rotor mounted on said shaft having at least one stepped portion providing a succession of decreasing clearances between said rotor and one of said teeth past which said stepped portion of said rotor revolves and likewise between said rotor and, in turn, each of the other of said teeth when said rotor revolves past them in turn as said shaft rotates in its normal direction, whereby each coil produces a repeating train of waves of ascending magnitude as said shaft rotates in its normal direction, and a threshold switch connected to the combined output of said pick-up coils and operating at a voltage threshold such as to be triggered by the greatest in amplitude of the waves of said train of waves at low speeds of said shaft and by the lowest in amplitude of said waves of said train of waves at high speeds of said shaft, the output of said threshold switch being connected so as to control the ignition timing of an internal combustion engine.

* * * * *